United States Patent [19]

Flix

[11] Patent Number: 5,718,323
[45] Date of Patent: Feb. 17, 1998

[54] DEVICE FOR SPACING PRODUCTS OR PRODUCT LOTS

[76] Inventor: Jean-Marie Flix, 3, rue Maillet, 10120 Saint-Germain, France

[21] Appl. No.: 702,759

[22] Filed: Aug. 22, 1996

[30] Foreign Application Priority Data

Aug. 22, 1995 [FR] France .................. 95 10071

[51] Int. Cl.⁶ ........................................ B65G 25/00
[52] U.S. Cl. ...................... 198/470.1; 198/474.1; 198/459.1
[58] Field of Search .............. 198/418.6, 419.2, 198/474.1, 431, 432, 433, 459.1, 460.1, 461.1, 461.2, 461.3, 470.1, 471.1

[56] References Cited

U.S. PATENT DOCUMENTS

| | | | |
|---|---|---|---|
| 3,902,587 | 9/1975 | Checcucci | 198/34 |
| 4,201,286 | 5/1980 | Meier | 198/461.3 |
| 4,396,109 | 8/1983 | Nambu | 198/431 |
| 5,156,093 | 10/1992 | Azukizawa et al. | 104/284 |
| 5,381,884 | 1/1995 | Spatafora et al. | 198/443 |
| 5,456,563 | 10/1995 | Halbo | 198/432 X |

FOREIGN PATENT DOCUMENTS

| | | |
|---|---|---|
| 3709046 | 10/1988 | Germany. |
| 95 08475 | 3/1995 | WIPO. |

*Primary Examiner*—James R. Bidwell
*Attorney, Agent, or Firm*—Ostrolenk, Faber, Gerb & Soffen, LLP

[57] ABSTRACT

A device for spacing products includes carriages each of which is capable of moving independently of the other carriages. Each carriage comprises a grasping element for grasping products, individually or by lots, a motor for driving a drive part, the drive part pulling the carriage on a guide, either directly or via a fixed or movable support arranged parallel to the guide rail. The grasping element and the drive motor of the drive part of each carriage being controlled by an electronic control box as a function of the spacing desired between two consecutive products and the direction which it is desired to impart to the product.

19 Claims, 2 Drawing Sheets

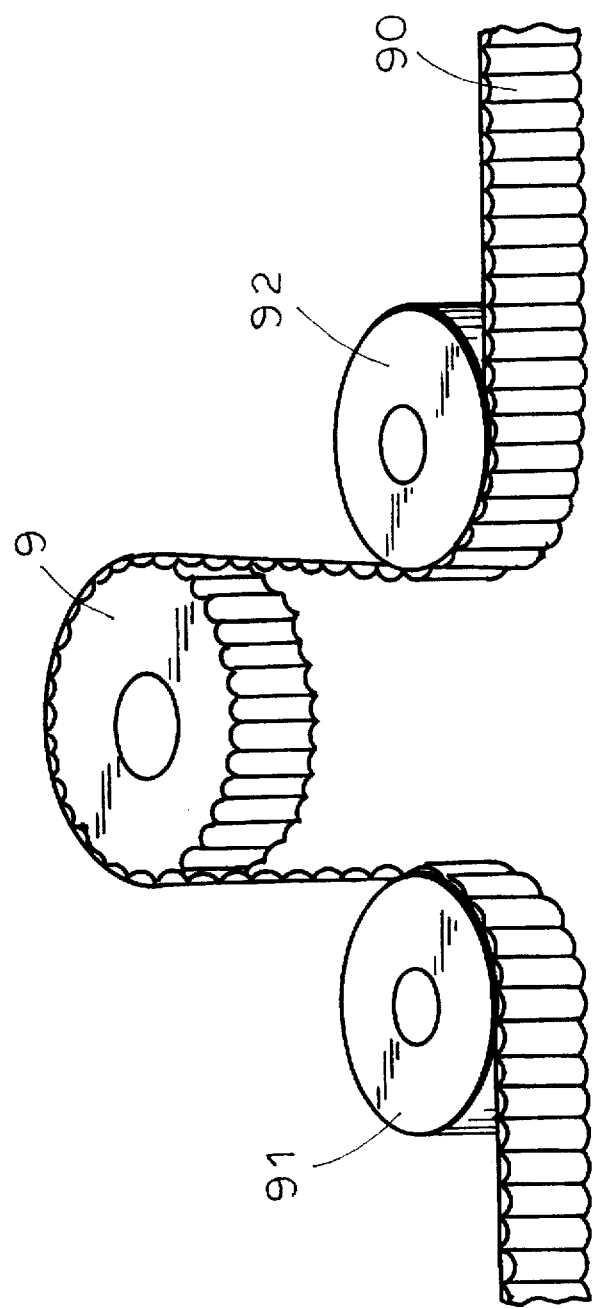

DEVICE FOR SPACING PRODUCTS OR PRODUCT LOTS

BACKGROUND OF THE INVENTION

1. Field of the Invention

The object of the present invention is a device which makes it possible to space products or lots of products fed by a conveyor on one or more rows, possibly imparting said products a specific direction for the packing of them.

2. Related Art

There are already known devices for separating products transported by a conveyor in rows, whether or not adjacent, for the packing of them, formed, in particular, of cylindrical parts arranged parallel to the direction of arrival of said products and in each of which there is present longitudinally an helicoidal groove of variable pitch intended to receive such products. The cylindrical parts are driven in rotation around their axis so as to bring the products, from one end to the other, the variable pitch creating a spacing between said products.

However, these devices can form lots only from one row of units or several rows placed side by side with a relatively large distance between them, and not from grouped lots of products.

Other devices for forming lots of products comprising inter alia a transfer chain or belt provided with carriages each having a roller, which are able to detach themselves from said chain while the rollers engage in the groove of a variable-pitch screw.

However, if it is desired to modify the distance between the products or lots of products, it is necessary to change the variable-pitch screw, which requires a temporary stop in production. Furthermore, it happens that certain products are wrongly directed before their spacing and are packed in the wrong direction.

SUMMARY OF THE INVENTION

The object of the present invention is to remedy these various drawbacks of the known devices by proposing a device which is intended to create an easily modifiable space between products arriving in rows by conveyor, or between lots of products, and furthermore to make it possible to impart the products a given direction.

The device in accordance with the invention is characterized essentially by the fact that it comprises carriages each of which is capable of moving independently of the other carriages and comprises means for grasping the products, individually or by lots, a motor driving a drive part which pulls said carriage on a guide rail on a closed curve, either directly or via a fixed or movable support arranged parallel to said guide rail; the grasping means and the drive motor of the drive part of each carriage being controlled by an electronic control box as a function of the spacing which it is desired to obtain between two consecutive products and the direction which it is desired to impart to said product.

In accordance with an additional characteristic of the device of the invention, the product-grasping means are articulated and controlled in their movement in such a manner as to be able to direct and/or displace said products in a precise position.

In accordance with the invention, the motors and the grasping means are connected to the control box either by electric cables or by remote control, in particular by radio, optically or electromagnetically. In this latter case, the control box is stationary while in the event that electric cables are used, the control box is movable in rotation around its axis so as not to block said electric cables.

In accordance with the invention, the control box contains electronic control means comprising a data acquisition and processing board, in particular data representative of the position of the carriages along the support.

In one advantageous embodiment of the device of the invention, the device comprises at least one electronic camera which issues signals representative of the images formed on its image pick-up and the optical field of which covers the inlet space of the products, said signals being analyzed by the data acquisition board so as to detect a possible fault in direction of any of said products and to control the grasping means of the carriage, which takes over said product in order to impart a correct direction to it.

In accordance with the invention, when the carriage drive support is stationary, it is formed of a rack with which the drive part meshes, which part may be a simple toothed wheel or a pinion.

When the drive support is movable, it is formed of a chain or notched belt stretched between two drive wheels having vertical axes, and the drive part is a drive pinion with vertical axis.

The advantages and characteristics of the present invention will become more clearly evident from the following description which refers to the accompanying drawing, which shows two non-limitative embodiments of the invention.

BRIEF DESCRIPTION OF THE DRAWINGS

In the accompanying drawing:

FIG. 2 is a detail view, in perspective, of the device of the invention in accordance with a second embodiment.

DETAILED DESCRIPTION OF THE PREFERRED EMBODIMENTS OF THE INVENTION

Figure 1:
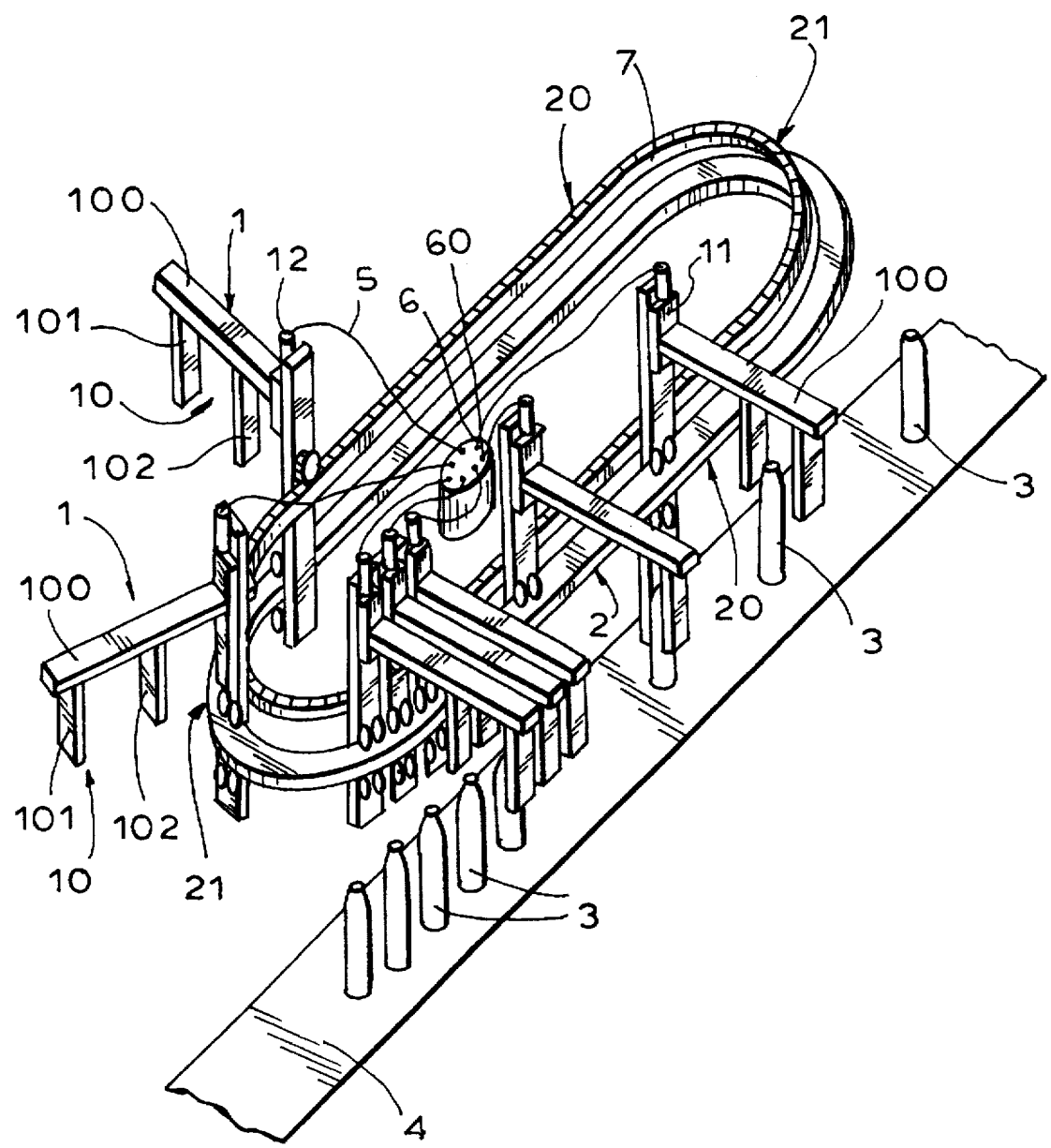
FIG. 1 is a view in perspective of the device of the invention in accordance with a first embodiment.

Referring to FIG. 1, it can be seen that the device of the invention comprises carriages 1 guided in displacement by a guide rail 2 comprising two linear portions 20 parallel to each other and connected by two rounded portions 21, said rail being arranged at the inlet of products 3 fed by a conveyor 4, the two linear portions 20 being parallel to the conveyor 4.

Each of the carriages 1 is equipped on the one hand with a means 10 for the grasping of the products 3 and, on the other hand, with a drive pinion 11 which meshes with a rack 7 and is moved by a motor 12. The means 10 for the grasping of the products 3 comprises a horizontal rod 100 which is movable in vertical translation, articulated at the end thereof attached to the carriage 1 in such a manner as to be able to pivot around its axis in a horizontal plane and in a vertical plane. The rod 100 supports two vertical arms 101 and 102 which are adjustable with respect to their distance apart so as to grasp a product 3. The grasping means 10 and the motors 12 driving the pinions 11 are controlled by a control box 6, arranged below the guide rail 2 and movable in rotation around its axis 60, containing a board for the acquisition and processing of data representative of the position of the carriages on the rack 7 or the guide rail 2. The board may, for example, comprise a microprocessor, memories, and input/output circuits connected to electric cables 5 connecting the grasping means 10 and the drive motors 12 of the pinions 11.

The operation of the device in accordance with this embodiment is as follows: The management of the displacement of the carriages 1 from the acquisition and processing board of the housing 6 consists in slowing down the said carriages 1 approaching the inlet of the products 3 so as to impart to them a speed substantially equal to that of the products 3 and, when that speed is reached, in controlling, by means of the box 6, the descent of the rod 100 of the grasping means 10 and the clamping of a product 3 by the two vertical arms 101 and 102, whereupon, once the product 3 is grasped, lifting it by bringing about the rising of the rod 3 and accelerating the carriage 1 in order to bring it, for instance, in step with a bucket chain, not shown in the figure and which would be parallel to the conveyor 4. The space between the products 3 is determined by the components of the acceleration and the speed imparted to the carriages 1.

Furthermore, an electronic camera monitoring the direction of the products 3 can advantageously be arranged at the inlet of said products on the conveyor 4, with suitable illumination. The signals given off by the camera are then interpreted by the electronic board of the housing 6, which, in the event that the interpretation of the signals leads to the detection of an incorrect direction of a product 3, after the grasping of this product 3 by a carriage 1, control in movement of the rod 100 of the grasping means 10 so as to impart the proper direction to it.

Referring to FIG. 2, it can be seen that, in a second embodiment, the carriage 1 comprises a toothed drive pinion 9 which meshes with a notched belt 90 stretched over it by means of two deviation pinions 91 and 92 arranged on opposite sides of said drive pinion 9.

The carriages 1 therefore have an absolute velocity which is equal to their vertical velocity with respect to the belt, reached due to their own motorization plus the speed of the belt, so that it is necessary to have their motors turn in opposite direction in order to brake the carriages for the grasping of the products 3, the acceleration phase bringing the carriages 3 to the speed of the belt 90 although it is then no longer necessary to control the operation of their motor except if it is desired to change the space between the carriage in question and the one which precedes it.

I claim:

1. A device for spacing products being fed by a conveyor, comprising:

a guide rail;

a plurality of carriages operatively coupled to the guide rail, the carriages being capable of moving independently of one another, the carriages including (i) a grasping element capable of grasping the products; (ii) a drive part operatively coupled to the guide rail for moving the carriage therealong; and (iii) a motor coupled to the drive part for driving the drive part;

a controller for controlling the grasping elements and motors of the carriages as a function of the spacing which is desired between products.

2. The device of claim 1, further comprising a stationary support arranged in parallel relationship with the guide rail, the drive part being coupled to the stationary support to move the carriage along the guide rail.

3. The device of claim 2, wherein the controller comprises a data acquisition board for the acquisition and processing of data, particularly data representative of the position of the carriages along the stationary support.

4. The device of claim 1 wherein the grasping elements are articulated and controlled in movement such that they are capable of directing and displacing products in a precise position.

5. The device of claim 1, wherein the grasping element comprises a rod movable in vertical translation and articulated at an end attached to the carriage such that it is pivotable around its axis both in a horizontal plane and in a vertical plane; and two spaced apart vertical arms supported by the rod to provide an adjustable space between the arms.

6. The device of claim 5, wherein the vertical arms are capable of central articulation.

7. The device of claim 1, wherein the motors and the grasping elements are connected to the controller by at least one of electric cables, remote control, radio, optical, and electromagnetic means.

8. The device of claim 3, further comprising at least one electronic camera for providing signals representative of the direction of movement of the products, wherein the data acquisition board detects a possible defect in the direction of at least one of the products and controls the grasping element of the carriage grasping the product in order to correct its direction.

9. The device of claim 2, wherein the stationary support comprises a rack with which the drive part meshes.

10. The device of claim 1, further comprising a movable support arranged in parallel relationship with the guide rail, the drive part being coupled to the movable support to move the carriage along the guide rail.

11. The device of claim 10, wherein the movable support comprises a chain or a notched belt stretched between two drive wheels having vertical axes, the drive part including a drive pinion having a vertical axis.

12. The device of claim 1, wherein the carriages are capable of imparting a direction of movement to the product and the controller controls the grasping elements and motors of the carriages as a function of the desired direction to impart to the products.

13. The device of claim 1, wherein the products are fed by the conveyor in more than one row.

14. The device of claim 1, wherein the grasping elements are capable of grasping the products individually.

15. The device of claim 1, wherein the grasping elements are capable of grasping the products in lots.

16. The device of claim 1, wherein the guide rail is of a curved shape.

17. The device of claim 10, wherein the movable support includes a notched belt and the carriage includes a toothed drive pinion which meshes with the notched belt for moving the carriage along the guide rail.

18. The device of claim 10, wherein the notched belt is capable of imparting a first velocity to a particular carriage and the motor of that carriage is capable of imparting a second velocity thereto such that the velocity of the carriage is the sum of the first and second velocities.

19. The device of claim 18, wherein the motor of the carriage is reversible to brake the carriage for grasping the product.

* * * * *